Patented Aug. 31, 1954

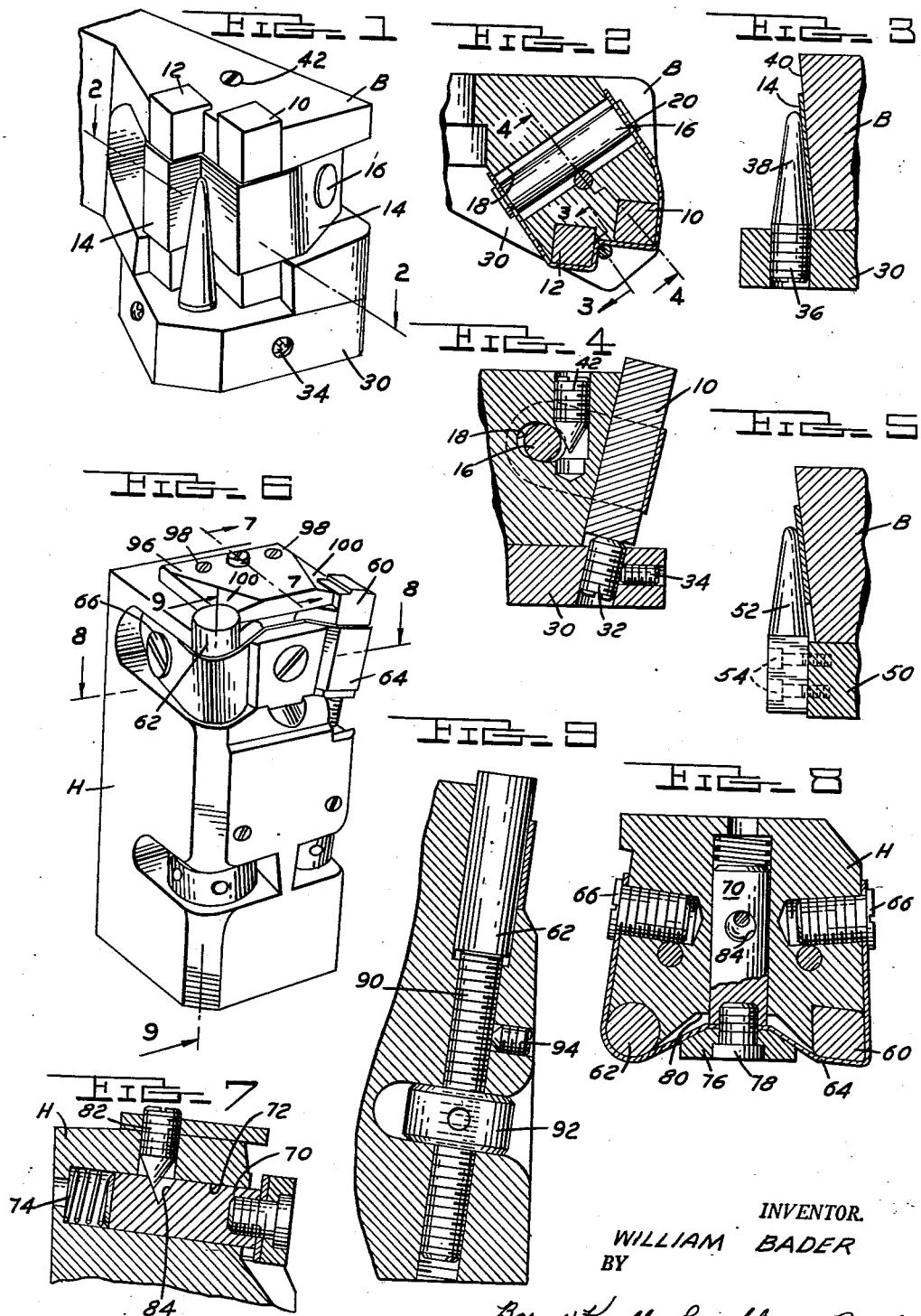

2,687,563

UNITED STATES PATENT OFFICE 2,687,563

TOOLHOLDER

William Bader, Birmingham, Mich., assignor to Wesson Multicut Company, Ferndale, Mich., a corporation of Michigan Application May 26, 1951, Serial No. 228,412

8 Claims. (Cl. 29—97)

This invention relates to a tool holder and has particularly to do with that type of holder in which a cutting bit is held in place on a tool body by a band-type of holder which surrounds the tool on one side and is tensioned to hold the tool in a recess in the body.

Reference is made to applicant's co-pending application Serial No. 176,733, filed July 29, 1950, now Patent 2,624,103 issued Jan. 6, 1953.

This present invention is an improvement over the holding device illustrated in the aforesaid application, the present construction to be disclosed being particularly adapted to the holding of two or more tool bits or cutting blocks such as solid carbide inserts in a single tool holder.

Drawings accompanying the application, and the various views thereof may be briefly described as:

Figure 1 a perspective view of one modification of the invention.

Figure 2 a sectional view on line 2—2 of Figure 1.

Figures 3 and 4 sectional views on lines 3—3 and 4—4 of Figure 2.

Figure 5 a sectional view of a modified construction somewhat similar to that shown in Figure 3.

Figure 6 a second modification showing a tool block in perspective with two cutting inserts.

Figs. 7, 8 and 9 sectional views on lines 7—7, 8—8 and 9—9, respectively, of Figure 6.

A band holding device for tool inserts of the solid carbide type has been previously described in my co-pending application Serial No. 176,733, filed July 29, 1950.

In some installations it has been found that close spacing of two inserts for cuts which are close together requires that the inserts be mounted on the same tool holder. This same space limitation prevents the use of the standard holding construction as shown in the aforesaid application.

In the present case, as shown in Figure 1, the inserts are nested in recesses in a tool body B. The inserts shown at 10 and 12 are more or less in parallel relation, and a band 14 passes around the inserts, the ends extending back to a pin 16.

The pin 16 is positioned in a cross bore 18 which, as shown in Figure 4, has an oval cross section to permit shifting of the pin. The ends of the pin have grooves 20 to receive the rear margins of holes in the ends of the band 14. The pin 16 is dimensioned to pass through these holes.

Below the tool body B is a base plate 30 which is suitably fastened rigidly to the body by means not shown. In this base plate a backing screw 32 passes upwardly at an angle to serve as a backing for the insert 10 (see Figure 4).

A similar construction is used for insert 12. A locking screw 34 is used for the adjusting screw 32. Also extending upwardly through the plate 30 is a threaded pin 36 with a tapered head 38.

The head is tapered in such a way as to have a surface paralleling the wall 40 of the base B, and thus the band 14, which is interposed between the head 38 and the wall 40, is held tightly against the wall.

When a backward thrust is placed against pin 16 by conically ended screw 42, shown in Figure 4, pressure is transmitted through each end of the band 14 to the respective inserts 10 and 12.

The anchor post 36 insures tension on the band and prevents an unfolding action. With this arrangement the two solid carbide inserts 10 and 12 are urged back into the recesses in the body with sufficient rigidity that they can perform the cutting operation assigned to them.

In Figure 5 a modification is shown in which the base plate 50 is necessarily shorter, and a modified anchor post 52 is fastened to the end of the base plate by small bolts 54.

In Figure 6 a block type of insert holder is shown for a certain type of cutting operations wherein the holder block H rests on a plate when in operation. With this arrangement all controlling units must be available above the base.

Inserts 60 and 62 are held in recesses in the corners of the block by a band 64, the ends of which are anchored by headed screws 66.

As shown best in Figures 7 and 8, a plunger 70 slides in a bore 72. This plunger extends transversely of the body and is backed by a spring 74.

The band 64 is perforated centrally thereof and locked to the end of the plunger 70 by a lug 76 and a bolt 78 passing through the lug and the band into the end of the plunger 70.

The surface of the body H adjacent the end of the plunger opening is formed at 80 to receive the lug 76 and the band. Therefore, the plunger may be moved inwardly into the body by a conically ended screw 82 which co-operates with a conical recess 84 in the side of the plunger.

As shown in Figure 7, screwing in the small screw 82 will force the plunger back against the spring 74 and draw tight the band 64 against the inserts 60 and 62, the ends of the band being securely anchored by the bolts 66.

Backing screws required for the inserts 60 and 62 are shown at 90 in Figure 9 to be controlled by a knurled nut 92 and locked by a screw 94. On the top of the block H is an adjustment screw plate 96 held in place by screws 98. This screw plate has ground corners 100 which position directly adjacent the inserts 60 and 62 and permit finger nail adjustment of the inserts in their outward movement.

What I claim is:

1. A tool holder of the type in which a bit is held in a tool body by a tensioned strap member which comprises a body having elongate recesses on the outer surface thereof having axes extending in substantially the same direction and means for retaining bits in said recesses comprising a band anchored at each end to encompass said recesses, and means urging said band toward said body between said recesses.

2. A tool holder of the type in which a bit is held in the tool body recess by a tensioned strap member which comprises a body having a plurality of elongate recesses in the outer surface thereof, tool bits in said recesses, a band surrounding said bits and a portion of said body, means to urge said band toward said body between said bits, and means to draw said band against said body and said means to hold said bits in rigid position.

3. A tool holder of the type in which a bit is held in a tool body recess by a tensioned strap member which comprises a body having a plurality of elongate tool bit recesses in the outer surface thereof having axes extending in substantially the same direction, a band to hold said bits in said recesses having its ends anchored at opposite sides of said body whereby it encompasses said recesses, and means between said bits anchored on said body to urge said band toward said body to hold said bits in said recesses.

4. A tool combination as defined in claim 3 in which the means for creating tension on the band comprises a plunger operating in a bore in said body, and means in said body to cause inward movement of said plunger to create a tensioning effect on said band against said bits to hold the bits rigidly in place.

5. A tool holder of the type in which a bit is held in the tool body recess by a tensioned strap member, which comprises a body having a top and bottom surface, side surfaces, and an end surface, a continuous recess formed in the side and end surfaces, a plurality of elongate recesses formed in the body adjacent said continuous recess, and extending through the top surface of the body, tool bits in said elongate recesses projectable to the top surface of the body, a band in said continuous recess surrounding said bits and anchored at opposite sides of said body in said continuous recess, and means anchored on one wall of said continuous recess between said elongate recesses positioned to urge said band toward said body between said bits.

6. A tool holder of the type defined in claim 5 in which the last means comprises an upstanding stud having a surface to parallel a surface of the band between the bits and anchored on one side surface of the continuous recess in the body.

7. A tool holder as defined in claim 5 in which the last means comprises a plunger slidably mounted in said body between said recesses, and means fastened to said plunger, gripping said band between said bits whereby retraction of said plunger draws said band against said bits and toward said body to hold the bits in rigid position in the elongate recesses.

8. A tool holder of the type in which a bit is held in the tool body recess by a tensioned strap member which comprises a body having a top and bottom surface, side surfaces, and an end surface, a continuous recess formed in the side and end surfaces, a plurality of elongate recesses formed in the body adjacent said continuous recess and extending through the top surface of the body, tool bits in said elongate recesses projectable to the top surface of the body, a band in said continuous recess surrounding said bits and anchored at opposite sides of said body in said continuous recess, said elongate recesses having axes disposed at an angle to the planes of the side surfaces and end surfaces, a plunger in said body between said elongate recesses disposed at an angle in said body to approximate a position normal to a plane passing through the axes of said bit recesses, and means to draw said plunger into said body to apply tension to said strap to urge said bits into said elongate recesses.

References Cited in the file of this patent

FOREIGN PATENTS

| Number | Country | Date |
|---|---|---|
| 174,575 | Great Britain | May 11, 1922 |
| 449,653 | Germany | Feb. 26, 1926 |
| 494,973 | Germany | Mar. 31, 1930 |
| 565,126 | France | Jan. 16, 1924 |